(12) United States Patent
Anstey et al.

(10) Patent No.: US 9,995,374 B2
(45) Date of Patent: Jun. 12, 2018

(54) DRIVE SYSTEM WITH HYDRAULIC IDLER TENSIONER

(71) Applicant: DEERE & COMPANY, Moline, IL (US)

(72) Inventors: Henry D. Anstey, Ottumwa, IA (US); Daniel E. Derscheid, Hedrick, IA (US)

(73) Assignee: DEERE & COMPANY, Moline, IL (US)

( * ) Notice: Subject to any disclaimer, the term of this patent is extended or adjusted under 35 U.S.C. 154(b) by 0 days. days.

(21) Appl. No.: 15/278,103

(22) Filed: Sep. 28, 2016

(65) Prior Publication Data

US 2017/0016518 A1 Jan. 19, 2017

Related U.S. Application Data

(62) Division of application No. 14/685,805, filed on Apr. 14, 2015, now Pat. No. 9,528,576.

(51) Int. Cl.

| *F16H 7/22* | (2006.01) |
|---|---|
| *F16H 7/08* | (2006.01) |
| *F16H 7/12* | (2006.01) |
| *A01F 15/08* | (2006.01) |
| *A01D 69/00* | (2006.01) |
| *A01D 69/03* | (2006.01) |

(Continued)

(52) U.S. Cl.
CPC .......... *F16H 7/1281* (2013.01); *A01D 69/002* (2013.01); *A01D 69/03* (2013.01); *A01D 69/08* (2013.01); *A01F 15/0841* (2013.01); *F16H 7/00* (2013.01); *F16H 7/08* (2013.01); *F16H 2007/0812* (2013.01); *F16H 2007/0865* (2013.01); *F16H 2007/0885* (2013.01); *F16H 2007/0893* (2013.01)

(58) Field of Classification Search
CPC ........... F16H 2007/0874; F16H 7/1281; F16H 2007/0806; F16H 2007/0812; F02B 67/06
USPC ................................. 474/134, 110, 103, 104
See application file for complete search history.

(56) References Cited

U.S. PATENT DOCUMENTS

| 2,082,634 A | 6/1937 | Johnstone |
| 2,356,567 A | 8/1944 | Cockrell |

(Continued)

FOREIGN PATENT DOCUMENTS

| EP | 1340421 A1 | 9/2003 |
| EP | 1974601 A1 | 10/2008 |

OTHER PUBLICATIONS

European Search Report, dated Jul. 6, 2016, 8 pgs.

*Primary Examiner* — Henry Y Liu
(74) *Attorney, Agent, or Firm* — Taft Stettinius & Hollister LLP; Stephen F. Rost (57) ABSTRACT

A drive system for an agricultural work machine having a primary drive system configured to drive a performance system for performing a crop preparation or handling operation including a fluid motor, a fluid pump and a tensioner system. The fluid motor is configured to produce a drive force and to be driven by a flow of fluid moving through the motor. The fluid pump is operatively connected to the fluid motor and is configured to drive the fluid motor. The tensioner system is operatively connected to the fluid motor and to the fluid pump, wherein the direction of fluid flow through the fluid motor adjusts the application of at least one force applied to a belt in the drive system. The fluid motor is configured to adjust the force applied to the belt by regulating a belt tension in proportion to a torque provided by the fluid motor.

17 Claims, 9 Drawing Sheets

(51) Int. Cl.
*A01D 69/08* (2006.01)
*F16H 7/00* (2006.01)

(56) References Cited

U.S. PATENT DOCUMENTS

| | | | |
|---|---|---|---|
| 2,639,623 A | 5/1953 | Ausherman |
| 2,726,364 A | 12/1955 | Merritt |
| 2,766,417 A | 10/1956 | Merritt |
| 2,954,726 A | 10/1960 | Kerridge |
| 3,012,520 A | 12/1961 | Curtis |
| 3,184,374 A | 5/1965 | Pearson |
| 3,403,474 A | 10/1968 | Spasoff |
| 3,575,058 A | 4/1971 | Kraus |
| 3,640,145 A | 2/1972 | Kraus |
| RE27,861 E | 1/1974 | Kraus |
| 3,817,114 A | 6/1974 | Klee |
| 3,887,026 A | 6/1975 | Allison |
| 4,007,826 A | 2/1977 | Brown et al. |
| 4,564,098 A | 1/1986 | Hörmann |
| 4,699,097 A | 10/1987 | Tanaka et al. |
| 4,758,208 A | 7/1988 | Bartos et al. |
| 4,758,310 A | 7/1988 | Miller |
| 4,759,256 A | 7/1988 | Kovit et al. |
| 4,877,487 A | 10/1989 | Miller |
| 4,893,883 A | 1/1990 | Satzler |
| 4,997,409 A | 3/1991 | Sonoda et al. |
| 5,002,519 A | 3/1991 | Oshima et al. |
| 5,132,604 A | 7/1992 | Shimane et al. |
| 5,176,581 A | 1/1993 | Kumm |
| 5,323,739 A | 6/1994 | Möllers |
| 5,334,106 A | 8/1994 | Purcell |
| 5,435,100 A | 7/1995 | Kuisis |
| 5,444,969 A | 8/1995 | Wagstaff et al. |
| 5,752,891 A | 5/1998 | Meckstroth et al. |
| 5,997,423 A | 12/1999 | Kwon |
| 6,151,924 A | 11/2000 | Plath et al. |
| 6,478,701 B1 | 11/2002 | Yasuhara et al. |
| 6,592,481 B2 | 7/2003 | Sato et al. |
| 6,609,985 B2 | 8/2003 | Todd et al. |
| 6,609,989 B2 | 8/2003 | Bogner et al. |
| 6,648,783 B1 | 11/2003 | Bogner |
| 6,651,416 B2 | 11/2003 | Trelstad et al. |
| 6,652,401 B2 | 11/2003 | Liu |
| 6,689,001 B2 | 2/2004 | Oliver et al. |
| 6,726,532 B2 | 4/2004 | Lin et al. |
| 6,821,223 B2 | 11/2004 | Henry |
| 6,834,631 B1 | 12/2004 | Blackburn et al. |
| 6,852,050 B2 | 2/2005 | Sands et al. |
| 6,960,145 B2 | 11/2005 | Fraley et al. |
| 7,032,349 B2 | 4/2006 | Oberheide et al. |
| 7,117,989 B2 | 10/2006 | Weigel et al. |
| 7,217,206 B2 | 5/2007 | Stone et al. |
| 7,322,895 B2 | 1/2008 | Narnuduri |
| 7,419,447 B2 | 9/2008 | Serkh |
| 7,479,078 B2 | 1/2009 | Joslyn |
| 7,530,911 B2 | 5/2009 | Serkh |
| 7,553,248 B2 | 6/2009 | Busboom et al. |
| 7,648,436 B2 | 1/2010 | Horst et al. |
| 7,678,001 B2 | 3/2010 | Seeber |
| 7,699,731 B2 | 4/2010 | Bicchi et al. |
| 7,815,533 B2 | 10/2010 | Vrsek et al. |
| 7,900,381 B2 | 3/2011 | Clymans |
| 7,944,158 B2 | 5/2011 | Jiang et al. |
| 8,113,078 B2 | 2/2012 | Lang et al. |
| 8,291,687 B2 | 10/2012 | Herron et al. |
| 8,499,685 B2 | 8/2013 | Viaud |
| 8,541,972 B2 | 9/2013 | Lee et al. |
| 8,656,832 B2 | 2/2014 | Marques et al. |
| 2002/0039942 A1 | 4/2002 | Liu et al. |
| 2002/0039943 A1 | 4/2002 | Serkh |
| 2002/0065159 A1 | 5/2002 | Markley |
| 2003/0199350 A1 | 10/2003 | Henry |
| 2004/0043854 A1 | 3/2004 | Fraley et al. |
| 2004/0087401 A1 | 5/2004 | Serkh |
| 2005/0148420 A1 | 7/2005 | Masayuki |
| 2006/0270501 A1 | 11/2006 | Maile et al. |
| 2006/0287146 A1 | 12/2006 | McVicar et al. |
| 2007/0066428 A1 | 3/2007 | Tryphonos |
| 2007/0155558 A1 | 7/2007 | Horst et al. |
| 2007/0155559 A1 | 7/2007 | Horst et al. |
| 2007/0155560 A1 | 7/2007 | Horst et al. |
| 2008/0070731 A1 | 3/2008 | Vrske et al. |
| 2008/0139354 A1 | 6/2008 | Bogner |
| 2009/0291794 A1 | 11/2009 | Amanuma et al. |
| 2010/0103413 A1 | 5/2010 | Lang et al. |
| 2011/0070986 A1 | 3/2011 | Maguire et al. |
| 2012/0152644 A1 | 6/2012 | Kydd |
| 2012/0318589 A1 | 12/2012 | Staley et al. |
| 2013/0109518 A1 | 5/2013 | Kurematsu et al. |
| 2013/0260930 A1 | 10/2013 | Kurematsu et al. |
| 2014/0309882 A1 | 10/2014 | Antchak et al. |
| 2016/0007526 A1 | 1/2016 | Greulich et al. |

DRIVE SYSTEM WITH HYDRAULIC IDLER TENSIONER

CROSS-REFERENCES TO RELATED APPLICATIONS

This application is a divisional application of U.S. patent application Ser. No. 14/685,805, filed Apr. 14, 2015, entitled "Drive System with Hydraulic Idler Tensioner" which is hereby incorporated by reference in its entirety.

FIELD OF THE DISCLOSURE

The present disclosure generally relates to a work machine including a drive system configured to drive a gear train, and more particularly to a baler for baling cut crop including an idler system for the drive system.

BACKGROUND

Agricultural equipment, such as a tractor or a self-propelled combine-harvester, includes a prime mover which generates power to perform work. In the case of a tractor, the prime mover is gas powered engine or a diesel engine that generates power from a supply of fuel. The engine drives a transmission which moves wheels or treads to propel the tractor across a field. In addition to providing power to wheels through a transmission, tractors often include a power takeoff (PTO) which includes a shaft coupled to the transmission and which is driven by the engine.

In both gas powered and diesel powered engines, the amount of work performed not only includes moving the vehicle along a road or field, but delivering power to a wide variety of accessories driven the engine and often by the PTO. The PTO of agricultural equipment drives what is known as work machines, also known as performance systems which include but are not limited to: farm implements or attachments, discs, spreaders, combines, or balers. Some work vehicles include a hydraulic machine having a hydraulic pump which can be used, for instance, to raise or lower a piece of equipment such as a mower. In other embodiments, the PTO can be coupled to a number of different types of equipment, including but not limited to log splitters, pumps, concrete mixers, mulchers, chippers, balers, harvesters, spreaders, and sprayers.

Work machines, including many agricultural work machines such as balers, are known to use a single drive source to power multiple performance systems each designed to accomplish a task within the overall function of the machine. The performance systems may require periodic maintenance or adjustment for proper operation. Performing the maintenance or adjustment procedure often requires precise positioning of the parts in the performance system and/or advancing the parts through an operating cycle of the system in a slow, controlled manner for observation of the operation of individual components.

The torque provided by the engine of a tractor, for instance, is directed to the work machine through a work machine drive train operatively connected to the PTO of the tractor. The machine drive train in a baler, for instance, includes a flywheel, which is used to store rotational energy delivered by the PTO. The amount of energy stored in the flywheel results from the weight of the flywheel as well as the rotational speed at which the flywheel operates. In one embodiment of a flywheel located in the baler, the amount of horsepower provided by the flywheel can be 1000 horsepower, which provides a large amount of rotational power, or torque. While rotational control of the flywheel in the baler during a baling operation is important to maintaining control of the baling process, it is also important to be able to adjust the position of the flywheel when the performance system needs maintenance, repair, or fails other reasons.

One performance system in the baler is a knotter system which guides twine around a bale being formed, ties the twine, and cuts the twine to complete the bale. It is recommended that various components in the knotter system be adjusted for optimum performance. As part of the adjustment or maintenance function, it can be necessary to first move parts of the knotter system to certain positions for adjustment, and then to rotate the system through a full operating cycle to observe the positions and operations of the components during the performance cycle. For example, when adjusting a needle protection linkage in a baler knotter system, the baler flywheel is moved to a precise position for adjusting the needle protection linkage. Once adjusted, a complete operating cycle of the knotter system is made to observe that the protection linkage gap is properly set. Similar procedures are followed for making adjustments to other components of the knotter system, such as the tucker arms, twine fingers and needles.

Under some circumstances, baling operations can fail if the amount of cut crop becomes excessive in the baling chamber or if a foreign object, such as a large rock, enters the baling chamber and interferes with the baling operation. In each of these situations, the flywheel can continue to move, but becomes disconnected from the PTO driven drive train, through the action of a clutch mechanism. Consequently, the final resting location of the flywheel can be at a position which is not conducive to removal of the obstruction or for eliminating the condition which has caused the baler to malfunction.

Balers, therefore, include a secondary drive mechanism to operate the drive system, including the flywheel, at a controllable reduced rate of speed. The flywheel, and therefore, the gear train driving the baler mechanism, are moved to or positioned at a location to allow the offending obstruction to be removed or the malfunction causing condition to be remedied. Such secondary drive systems are often driven by a drive belt having a belt tension which needs to be adjustably controlled for proper operation. In these systems, the tension is adjusted by a manual engagement lever which tightens the drive belt to a tension determined by an operator. Manual tightening of drive belt is, however, not an accurate process and often requires multiples attempts at tightening by an operator to determine the proper tension. If the tension is not correctly set, locating the flywheel at the required location can require multiple attempts to find the correct location. What is needed, therefore, is an idler system for a work machine which not only provides for accurate control of a flywheel location during periods of machine adjustment, maintenance, or repair, but also enables an operator to accurately control the location of the flywheel and therefore the drive system.

SUMMARY

In one embodiment, there is provided a drive system for an agricultural work machine having a primary drive system configured to drive a performance system for performing a crop preparation or handling operation. The drive system includes a motor configured to produce a drive force and a tensioner system. The tensioner system is operatively connected to the motor, wherein directional movement of the motor adjusts the application of at least one force applied in the drive system to adjust a tension thereof.

In another embodiment of the disclosure, there is provided a drive system for an agricultural work machine having a primary drive system configured to drive a performance system for performing a crop preparation or handling operation. The drive system includes a fluid motor configured to produce a drive force and to be driven by a flow of fluid moving through the motor and a fluid pump operatively connected to the fluid motor and configured to drive the fluid motor. A tensioner system is operatively connected to the fluid motor and to the fluid pump, wherein the direction of fluid flow through the fluid motor adjusts the application of at least one force applied in the drive system to adjust a tension.

In still another embodiment of the disclosure, there is provided a drive system for an agricultural work machine having a primary drive system configured to drive a performance system for performing a crop preparation or handling operation. The drive system includes a hydraulic fluid pump having a fluid outlet and a hydraulic motor operatively connected to the fluid outlet of the hydraulic fluid pump, wherein the hydraulic motor includes an output. A wheel is operatively connected to the output of the hydraulic motor and to the primary drive system. The wheel is configured to be driven by the output of the hydraulic motor. A belt is operatively connected to the wheel and to the primary drive system. A tensioner is disposed adjacently to the belt, the tensioner being configured to tension the belt as the wheel is driven by the hydraulic motor.

In still another embodiment of the disclosure, there is provided an agricultural work machine driven by a primary power source to provide a crop preparation or handling operation. The work machine includes a performance system configured to perform the crop preparation or handling operation of the work machine. A primary drive system is operatively connected to the primary power source and is configured to drive the performance system for the crop preparation or handling operation. A secondary drive system is operatively connected to the primary drive system, wherein the secondary drive system includes a belt configured to adjust a condition of the primary drive system. The secondary drive system further includes a fluid driven motor having an output configured to be driven in a first direction by a fluid flowing in a first fluid flow direction and driven in a second direction by the fluid flowing in a second fluid flow direction. A first tensioner is disposed adjacently to the belt at a first location and configured to apply a first force to the belt at the first location in response to fluid flowing in the first fluid flow direction.

In another embodiment, there is provided an agricultural work machine driven by a primary power source to provide a crop preparation or handling operation. The work machine includes a performance system and a primary drive system. The performance system is configured to perform the crop preparation or handling operation of the work machine. The primary drive system is operatively connected to the primary power source and is configured to drive the performance system for the crop preparation or handling operation. A secondary drive system is operatively connected to the primary drive system, wherein the secondary drive system includes a belt configured to adjust a condition of the primary drive system. The secondary drive system also include a fluid driven motor having an output, configured to be driven in a first direction by a fluid flowing in a first fluid flow direction and driven in a second direction by the fluid flowing in a second fluid flow direction, and a first tensioner disposed adjacently to the belt at a first location. The first tensioner is configured to apply a first force to the belt at the first location in response to fluid flowing in the first fluid flow direction.

In a further embodiment, there is provided a method of providing a crop preparation or handling operation with a performance system of an agricultural work machine driven by a primary power source. The method includes: providing a primary drive system operatively connected to the primary power source and configured to drive the performance system for the crop preparation or handling operation; providing a secondary drive system operatively connected to the primary drive system, wherein the secondary drive system includes a fluid driven motor having a drive shaft providing a torque, the fluid driven motor operatively connected to a belt configured to adjust a condition of the primary drive system; and automatically adjusting a tension of the belt proportionally in response to the torque provided by the drive shaft of the motor.

In another embodiment, there is provided a method of preparing or handling crops with a performance system of an agricultural work machine driven by a primary power source, wherein the work machine includes a primary drive system operatively connected to the primary power source and a secondary drive system having a drive shaft operatively connected to the primary drive system. The method includes: adjusting a direction of the drive shaft in one of a first direction and a second direction with a directional flow of fluid, wherein the directional flow of fluid determines an amount of torque provided by the drive shaft in the first direction or the second direction; and applying at least one force to the drive system to adjust a tension thereof, wherein the force is applied proportionally in response to the amount of torque provided by the drive shaft.

In still another embodiment, there is provided a method of preparing or handling crops with a performance system of an agricultural work machine driven by a primary power source, wherein the work machine includes a primary drive system operatively connected to the primary power source and a secondary drive system having a drive shaft operatively connected to the primary drive system. The method includes: providing a user input device configured to generate a user input; adjusting a rotational speed and torque of the drive shaft in response to the user input with a directional flow of fluid in one of a first direction and a second direction, wherein the directional flow of fluid determines the rotational direction of the drive shaft in the first direction or the second direction; and applying at least one force to the drive system to adjust a tension thereof, wherein the force is applied proportionally in response to a torque of the drive shaft.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

DETAILED DESCRIPTION

For the purposes of promoting an understanding of the principles of the disclosure, reference will now be made to the embodiments described herein and illustrated in the drawings with specific language used to describe the same. It will nevertheless be understood that no limitation of the scope of the disclosure is intended. Such alterations and further modifications of the illustrated apparatus, assemblies, devices and methods, and such further applications of the principles of the disclosure as illustrated herein, are contemplated as would normally occur to one skilled in the art to which the disclosure relates.

Figure 1:
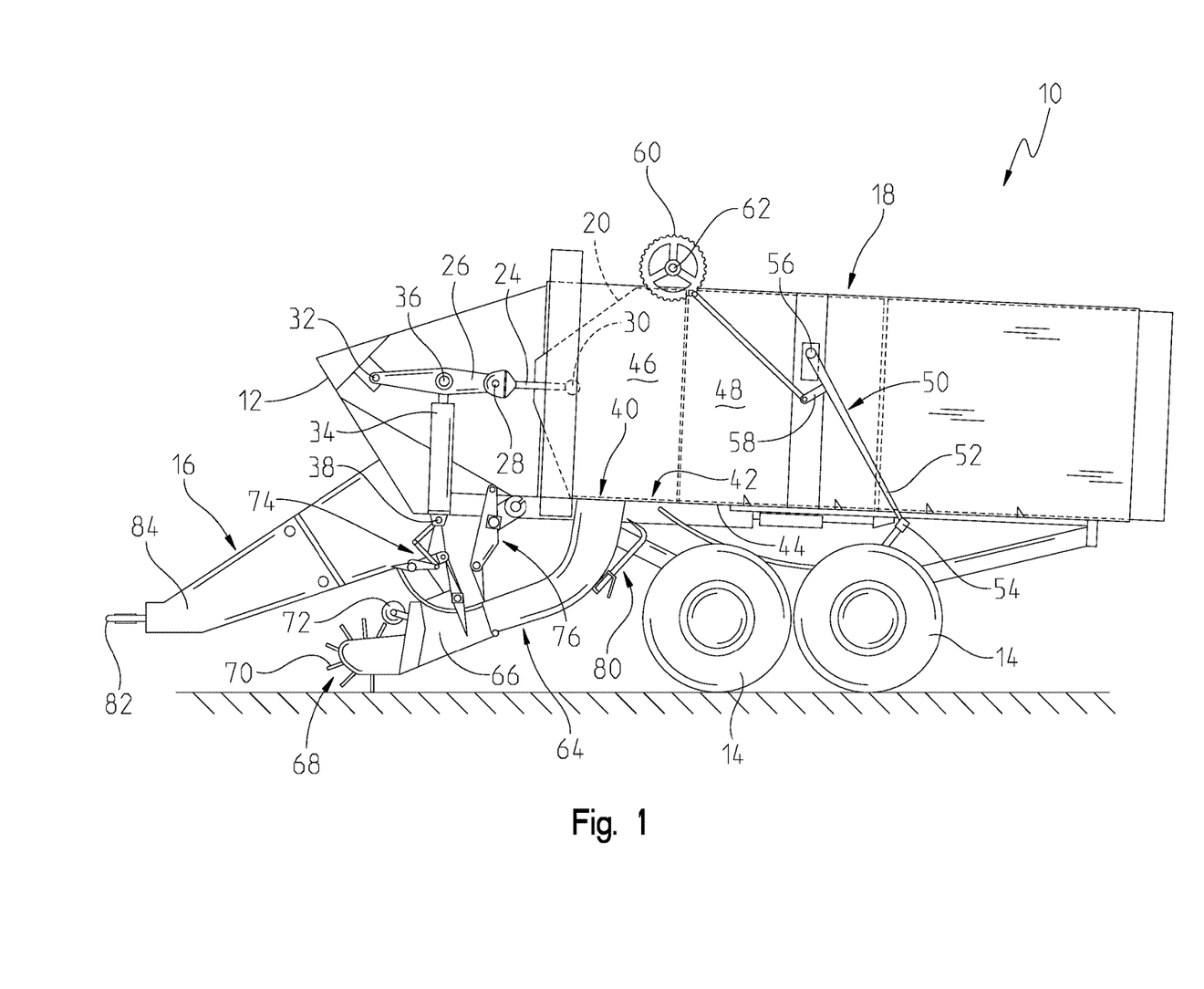
FIG. 1 is an elevational plan view of a baler.

Referring now to FIG. 1, a large rectangular baler 10 includes a main frame 12 supported on wheels 14 for being towed over the ground by a tractor (not shown) coupled to a forward end of a draft tongue 16, which is fixed to a forward end of the frame 12. A longitudinally extending baling chamber 18, of rectangular or square cross-section, is supported centrally on the frame 12 at an elevation above the sets of wheels 14.

A plunger head 20 is mounted in a forward section of the chamber 18 for being reciprocated through the action of a toggle linkage defined by a pair of transversely spaced first links 24 and a second link or crank arm 26. The links 24 and 26 are pivotally coupled to each other at a pivotal connection 28, with the pair of first links 24 being pivotally coupled to the plunger head 20 at respective pins 30, and with the second link 26 being coupled to the frame 12, as at a pin 32. A hydraulic plunger head drive cylinder 34 is provided for toggling the links 24 and 26, and for this purpose has a rod end coupled, as at a pin 36, to a location of the link 26. The link 26 is between the pivotal connections 32 and 28, and has a rod end coupled to the frame 12, as at pivot pin 38. When the drive cylinder 34 is fully retracted, as shown in FIG. 1, the plunger head 20 is fully extended to the rear, with the pins 30 and 32 being located such that they lie along a longitudinal central axis of the baling chamber 18. Extension of the cylinder 34 will cause the link 26 to be pivoted upwardly about the pin 32 resulting in the plunger head 20 being retracted to the extent that it uncovers a crop material inlet 40 extending entirely across a region located just in front of a stationary knife (not shown) provided across a forward end 42 of a bottom wall or floor 44 of the baling chamber 18.

The baling chamber 18 includes a front section 46 of fixed cross section which is joined to a rear section 48, of variable cross section, having opposite side panels which are respectively mounted for swinging horizontally about vertical hinges (not shown) provided at their forward ends. A twine tying arrangement (not shown) is provided for wrapping and tying multiple loops of twine about a completed bale. A needle yoke arrangement 50, including opposite arms 52, is joined by a cross tube 54. The needle yoke arrangement 50 is mounted for vertical pivotal movement about a horizontal transverse axis defined by pivotal connections 56 that connect respective ends of the arms 52 to opposite side locations of rear regions of the fixed front baling chamber section 46.

A plurality of curved, twine delivery needles, equal in number to the knotter drive gears, are respectively fixed to transversely spaced locations of the cross tube 54. A crank arm is provided at each of opposite ends of the knotter shaft and is pivotally connected between each crank arm and a coupler 58 fixed to each needle yoke arm 52, at a location close to the pivotal connection 56, is a connecting rod.

The bale tying cycle is initiated by a bale length sensor arrangement including a toothed metering wheel 60 mounted on a shaft 62 extending horizontally across and being rotatably mounted to the top of the baling chamber 18. The metering wheel 60 has a toothed periphery which extends into the baling chamber 18 and is contacted by a forming bale so as to be rotated as the bale grows in length. The rotation of the metering wheel 60 is sensed and converted into a signal representing bale length, with a control signal being sent to initiate the tying cycle when the forming bale reaches a length corresponding to a desired bale length.

The machine 10 includes a feed duct or chute 64 having an open forward end section 66, disposed for receiving crop from a pick-up arrangement 68. The chute 64 is curved upwardly and rearwardly from the forward end section to a near vertical rear end located for delivering crop through the baling chamber inlet 40. The pick-up arrangement 68 includes a rotary tine pick-up 70, including a drive rotor or shaft, and a pair of stub augers 72 following the pick-up 70 for centering crop to the width of the baling chamber 18. The duct 64 defines a chamber into which crop material delivered by the pick-up arrangement 68 is fed by a packer fork arrangement 74. Upon the material being compressed to a pre-selected density within the pre-charge chamber, a stuffer arrangement 76 engages a pre-compressed charge of crop material, sometimes called a flake or slice, and sweeps it from the pre-charge chamber and into the baling chamber 18, by way of the baling chamber inlet 40.

A retaining fork arrangement 80 includes a plurality of transversely spaced, hook-shaped retainer tines fixed at transversely spaced locations along a shaft of the arrangement 80. A density sensor, not shown, determines the density of the compressed crop. Once the compressed crop is determined to have a sufficient density, the retaining fork arrangement 80 moves from a retaining position to a release position, which allows the bale being formed and to move toward the rear section 48.

Figure 2:
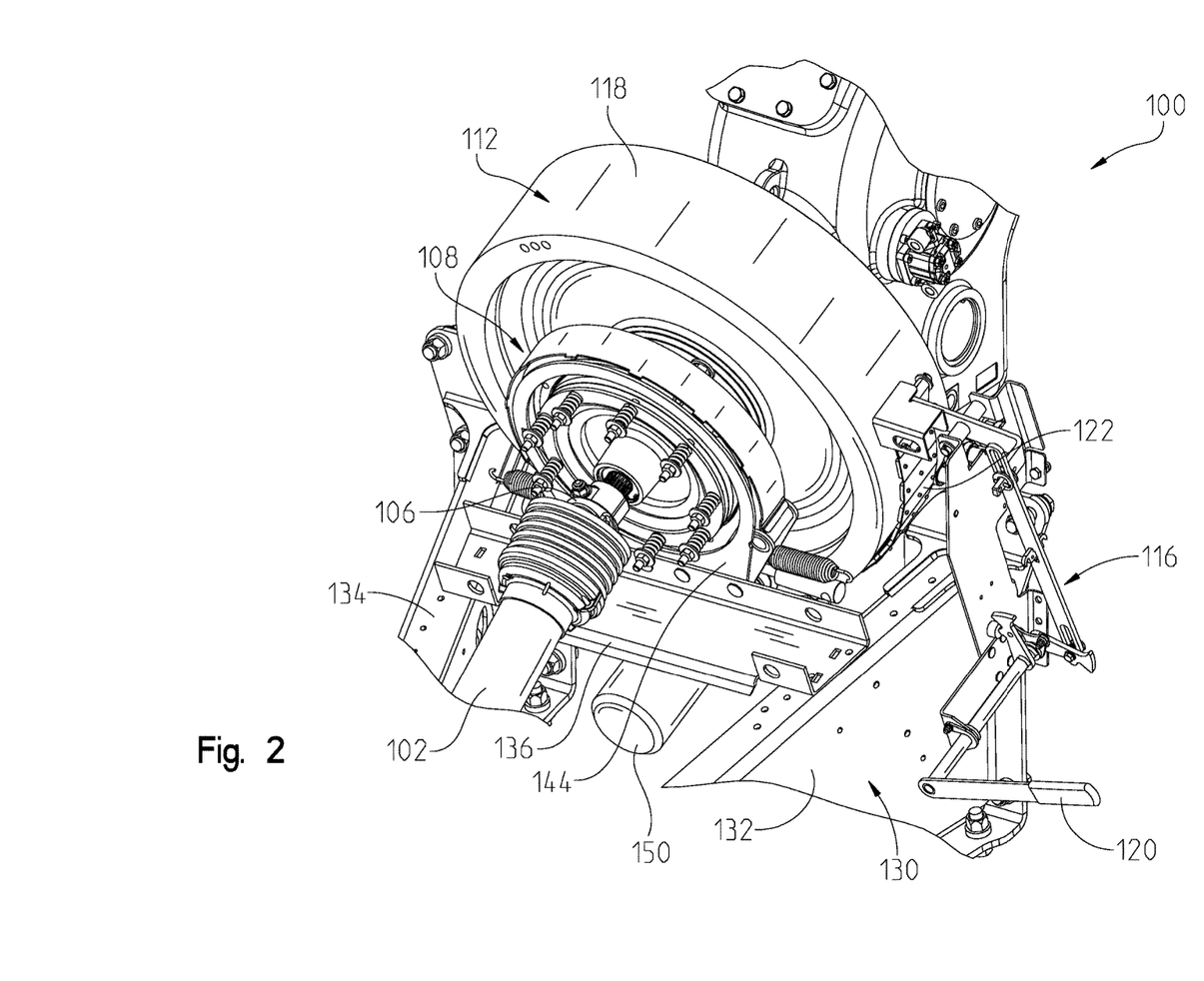
FIG. 2 is partial schematic perspective view of a drive system.
Figure 3:
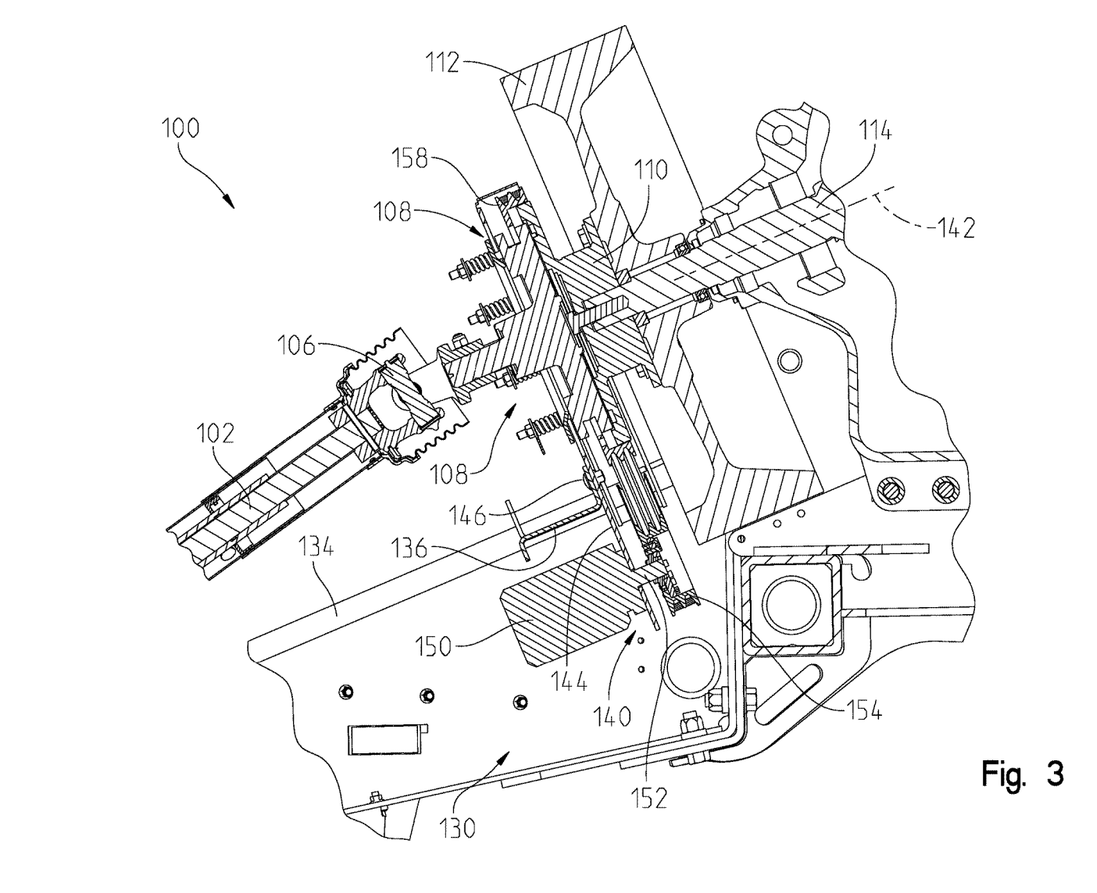
FIG. 3 is a partial cross-sectional view of a drive system

The draft tongue 16 includes a drive connector 82 which is configured to drive the above described systems and subsytems for forming bales, tying bales, and moving the formed bales into and out of the baling chamber 18. The draft tongue 16 includes a removable housing 84 which provides a cover for a primary drive system 100. The drive system 100, as further illustrated in FIG. 2 and FIG. 3, is illustrated without the housing 84.

The drive system 100 includes a drive shaft 102 having a first end coupled to the drive connector 82 by a first u-joint (not shown). A second end of the drive shaft 102 is coupled to a second u-joint 106. Operatively connected to the u-joint 106 is a torque limiting clutch assembly 108 which is illustrated schematically, but which is configured to disengage the drive connector 84 from a hub 110 to which the clutch assembly 108 is connected. The torque assembly 108 includes at least two parts which rotate together, but which either slip or become disengaged should the hub 110 experience a predetermined amount of excessive torque. The torque assembly 108 acts a torque limiting device configured to reduce or prevent damage to the drive system 100 when experiencing excessive loads, which either build up over time or which are instantaneously generated.

The hub 110 is fixedly coupled to a flywheel 112, which in turn is fixedly coupled to a drive shaft 114. The drive shaft 114 is operatively connected to the above described systems and subsytems for forming bales, tying bales, and moving the formed bales into and out of the baling chamber 18. During operation of the various systems and subsystems, the flywheel experiences sufficient angular momentum to develop several thousands of pounds of horsepower, which in general terms, is a large amount of torque. Consequently, when the flywheel needs to be slowed and stopped from rotation, a brake apparatus 116, which disposed adjacently to an exterior surface 118 of the flywheel 112, is used to brake the flywheel 112. See FIG. 2. The brake apparatus 116 includes a brake handle 120 which disposed at a location accessible to an operator outside the housing 84. Movement of the brake handle 120 moves a brake pad device 122 into and out of engagement with the surface 118 of the flywheel 112.

A frame portion 130 of the frame 12, which is generally covered by the housing 84 during operation of the baler 10, is configured to support the drive system 100 including the brake apparatus 116. The frame portion 130 includes a first support member 132 and a second support member 134 to which a support bracket 136 is coupled. The support bracket 136 extends from the first support member 132 to the second support member 134. The bracket 136 is configured to provide support for an idler system 140 illustrated in FIGS. 2, 3, 4, and 5.

The idler system 140, or jog drive system, is an alternative or secondary drive system, in addition to the primary drive system 100 which includes the drive connector 82 which is coupled to the PTO or some other external drive system. The idler system 140 is configured to move or adjust the location of the various system components including those described in the above described systems and subsystems for forming bales, tying bales, and moving the formed bales, to repair, maintain, or make adjustments to these and other performance systems of the work machine. The idler system 140, therefore, is configured to move the hub 110, the flywheel 112, and the drive shaft 114 in both a clockwise direction and a counter clockwise direction around a longitudinal axis 142 of the drive shaft 114 to repair, adjust, or maintain the baler performance systems.

Figure 4:
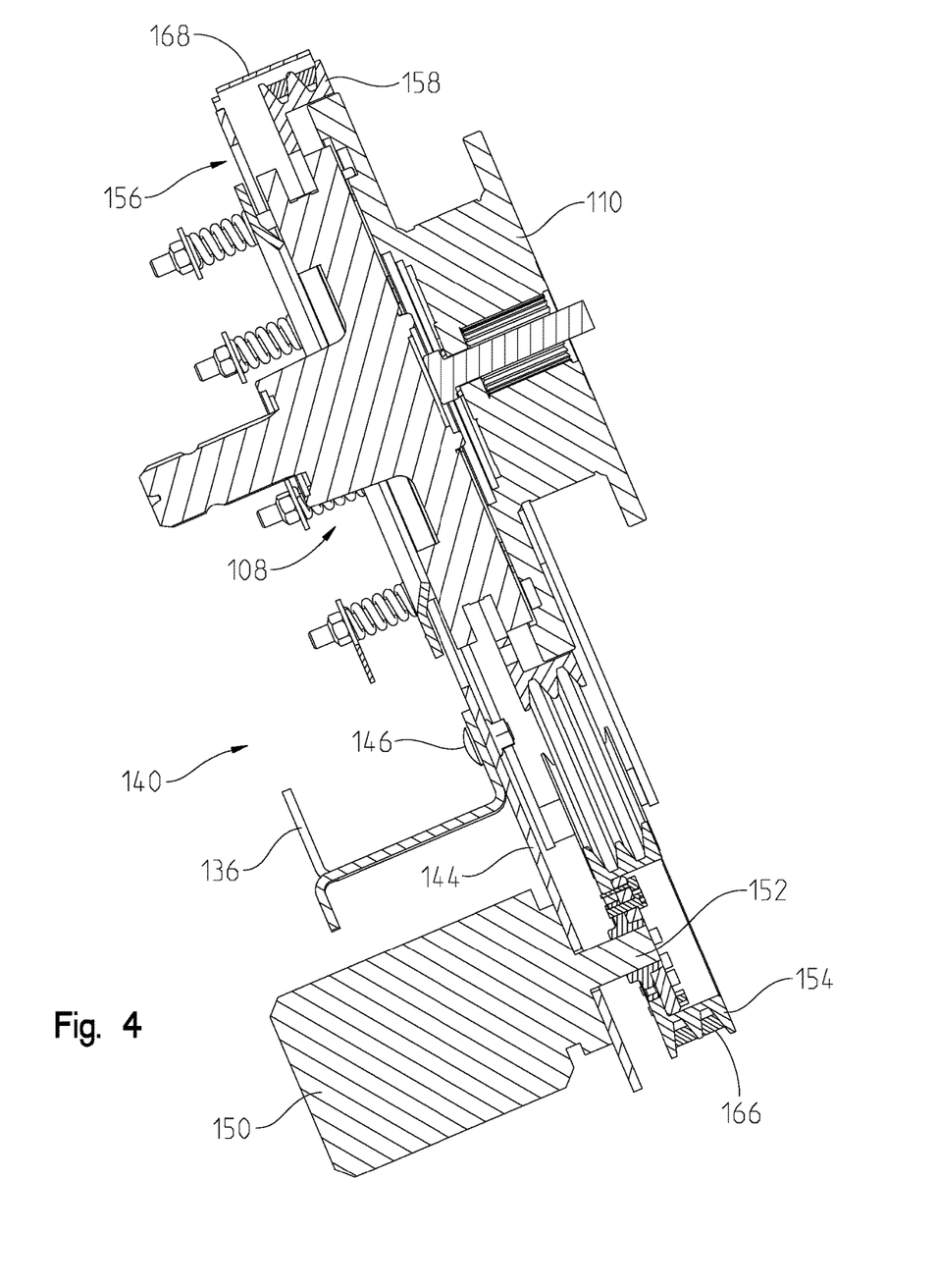
FIG. 4 is a cross-sectional view of an idler system.

As illustrated in FIG. 4, the idler system 140 is operatively connected to the bracket 136 for support by the internal frame 130. The idler system 140 includes a base 144, which is rigidly coupled to the bracket 136 by one or more connectors 146, and which support a motor 150. The motor 150 is fixedly coupled to the base 144 and includes an output drive shaft 152 which extends through the base 144 and to which a first pulley wheel 154 is operatively connected. The base 144, in one embodiment, is formed a sheet steel, and includes a "teardrop" shaped planar profile which defines an aperture 156 through which the clutch assembly 108 extends. In one embodiment, the motor 150 is a hydraulic motor having first and second ports (not shown) each of which are coupled to a hydraulic system configured to supply a flow of pressurized fluid to drive the drive shaft 152 directionally or rotationally in a first direction and a second direction depending on the direction of fluid flow. See FIG. 5, discussed later, for a fluid circuit. In another embodiment, the motor 150 is a pneumatic pump coupled to a pneumatic system and configured to rotate the drive shaft 152 in either a first or second direction. In still another embodiment, the motor 150 is an electric motor coupled to an electric system and configured to rotate the drive shaft 152 in either a first or second direction.

Figure 5:
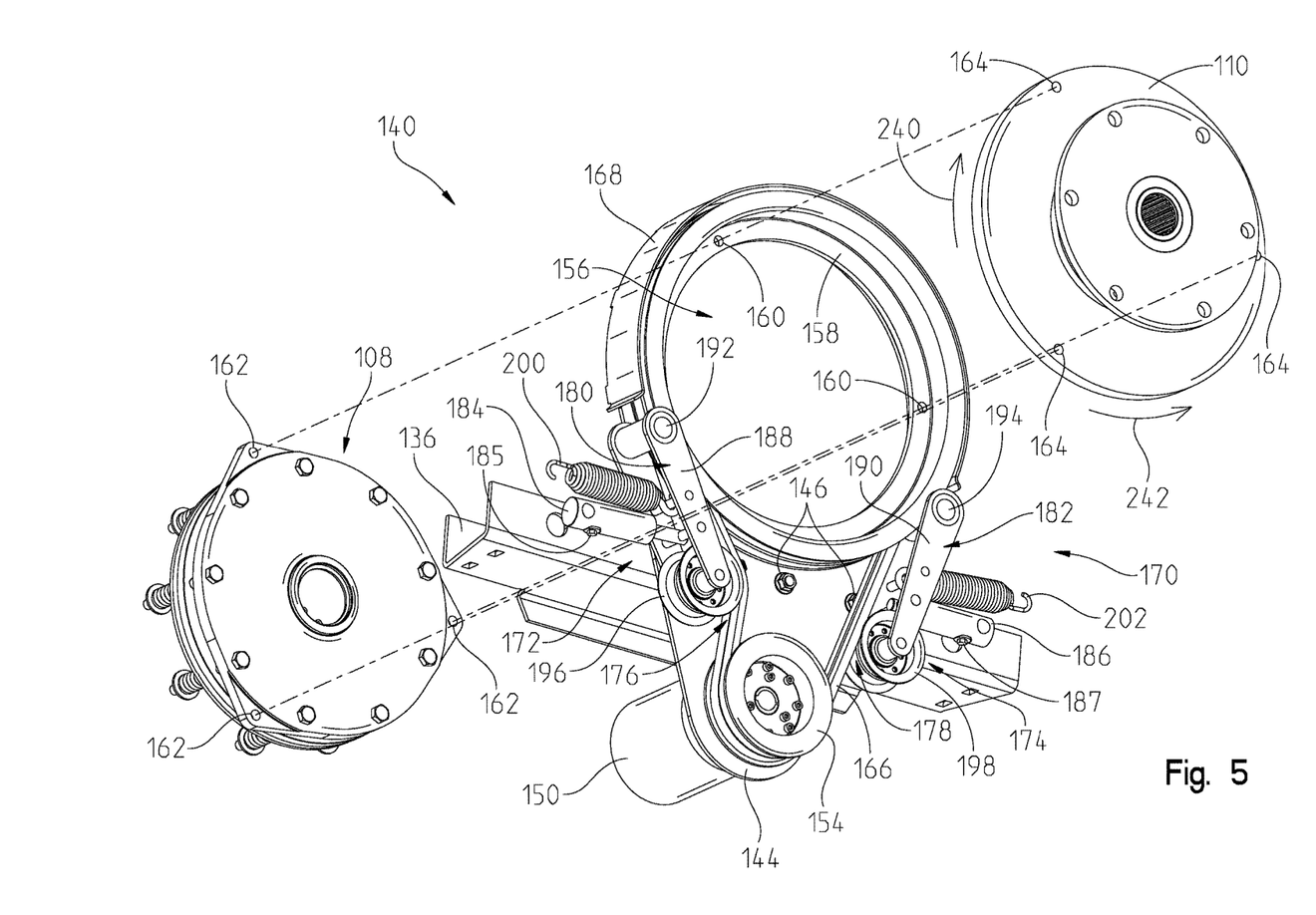
FIG. 5 is an exploded perspective view of an idler system.

A second pulley wheel 158 is disposed adjacently to the aperture 156 and is fixedly coupled to the clutch assembly 108 and the hub 110. As illustrated in FIG. 5, the second pulley 158 includes a plurality of apertures 160 which align with corresponding apertures 162 of the clutch assembly 108 and apertures 164 of the hub 110. Connectors (not shown) are received by each of the apertures 160, 162, and 164 to thereby fix the second pulley 158 to the clutch assembly 108 and to the hub 110 such that rotation of the drive shaft 102 moves the pulley 158 and rotational movement of the second pulley 158 moves both the clutch assembly 108 and the hub 110.

In the illustrated embodiment, both the first pulley 154 and the second pulley 158 are double-V pulleys configured to receive a double-V belt 166. In other embodiments, other types of pulleys and other types of belts are used. Consequently, rotation of the clutch assembly 108 or hub 110 driven by the drive shaft 102 rotates the second pulley 158 which rotates the first pulley 154 and therefore the shaft 152 of the motor 150. Likewise, rotation of the shaft 152 by the motor 150 moves the first pulley 154 which in turn moves the second pulley 158 and the hub 110 which moves the various performance systems. The clutch assembly 108 need not disengage when the motor 150 drives the belt 166. In this event, the drive shaft 102 rotates as well as the tractor shaft. The tractor allows rotation with some drag. A shield 168, seen in FIGS. 4 and 5, is operatively connected to the base 144, and partially covers or surrounds a portion of the v-belt 166 to provide a barrier between external unwanted forces or impacts and the belt 166.

As best seen in FIG. 5, the shield 168 extends just past a midline of the aperture 156 to leave a portion of the belt 166 exposed. An idler apparatus 170, also described herein as a belt tensioner system, disposed adjacently to the belt 166, includes a first idler mechanism 172 and a second idler mechanism 174. The idler apparatus 170 is configured to apply a force or pressure to tension the belt 166 at a first location 176 and at a second location 178. The force is applied respectively by a first idler arm device 180 and a second idler arm device 182. Each of the idler arm devices 180 and 182 are configured to tension the belt at locations 176 and 178 through the application of a force provided respectively by a first actuator 184 and a second actuator 186. In one embodiment, each of the actuators 184, 186 is a hydraulic cylinder having respectively an input port 185 and an input port 187. In another embodiment, the actuators 184, 186 are pneumatic actuators. In still another embodiment, the actuators 184, 186 are electric actuators. While the idler apparatus 170 is illustrated as including a first idler mechanism 172 and a second idler mechanism, in another embodiment the idler apparatus 170 includes a single idler mechanism.

As depicted in FIG. 5, each of the cylinders 184 and 186 includes a cylinder rod operatively connected to a respective idler arm 188 and 190. The cylinder ends are fixed to the support bracket 136 or other frame (not shown), such that movement of the cylinder rods moves each of the arms 188 and 190 about an axis 192 and 194. The axis 192 and 194 are fixed to a support bracket or frame (not shown) such that movement of the cylinder rods with respect to the cylinders moves the arms 188 and 190 toward or away from the belt 166 whereby an idler pulley 196 and idler pulley 198 apply tension respectively to locations 176 and 178. A bias element 200, for instance a coil spring, is coupled to a support bracket of the frame at one end. The other end of the spring 200 is operatively connected to the arm 188. A second bias element 202, for instance a spring, is coupled to the support bracket or frame at one end and the other end of the spring 202 is operatively connected to the arm 190. The hydraulic cylinders 184 and 186, when pressurized, respectively move the idler pulleys 196 and 198 into contact with the belt 166 with movement of the piston rods. The hydraulic cylinders 184 and 186, when de-pressurized, allow the idler pulleys 196 and 198 to move away from the belt 166 in response to the previously developed spring tension of the springs 200 and 202. In other embodiments, other types of bias elements to bias the arms are included.

Figure 6:
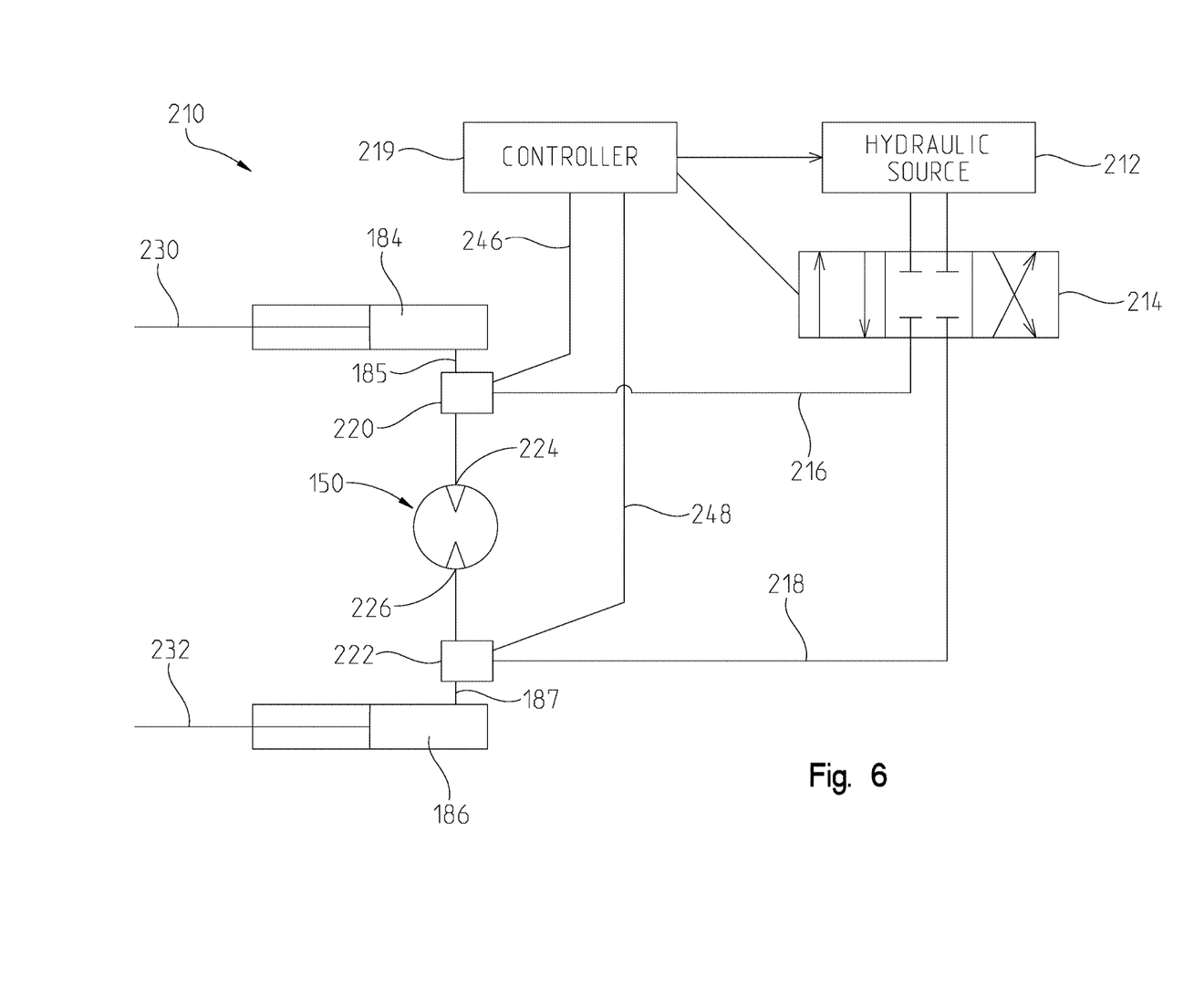
FIG. 6 is a fluid control circuit operatively connected to a motor and to a first and a second hydraulic cylinder.

FIG. 6 illustrates a fluid control circuit 210 operatively connected to the motor 150 and to the hydraulic cylinders 184 and 186. A hydraulic source 212 is operatively connected to valve 214 which is configured to provide a flow of fluid to and from the motor 150 over a first fluid line 216, or conduit, and a second fluid line 218, or conduit. First and second fluid connectors operatively couple the hydraulic source to first fluid line 216 and the second fluid line 218 through the valve 214. A controller 219 is operatively connected to the hydraulic source 212 and to the valve 214 to control the fluid delivered by the hydraulic source 212 and the direction of fluid flow through the valve 214 and to and from the hydraulic source 212. In one embodiment, the valve 214 is a four (4) way, three (3) position valve, which is configured to move the fluid in either direction along the first fluid line 216 and in either direction along the second fluid line 218. The motor 150, therefore, is responsive to the direction of the flow of fluid through the motor 150, such that the drive shaft 152 moves bi-directionally depending on the direction of the flow of fluid.

Each of the cylinders 184 and 186 respectively includes the ports 185 and 187 coupled respectively to a valve 220 and a valve 222. The fluid line 216 is operatively connected to the valve 220 and to the port 185 of the cylinder 184 through the valve 220. The valve 220 is also coupled to the motor 150 at a port 224. The fluid line 218 is operatively connected to the valve 222 and to the port 187 of the through the valve 222. The valve 222 is also coupled to the motor 150 at a port 226. In different embodiments, each of valves 220 and 222 includes a pressure or flow control valve used to control the flow of fluid through the lines 216 and 218 to adjust the performance and/or timing of the circuit 210, including the hydraulic action of the cylinders 184 and 186. Operation of each of the valves 220 and 222 is controlled by the controller 219 to achieve the desired performance and/or timing of the circuit 210.

Each of the cylinders 184 and 186, in one embodiment, are single acting cylinders having respective piston rods 230 and 232. The piston rods 230 and 232 move the arms 188 and 190 as previously described. In other embodiments, the cylinders 184 and 186 include double acting cylinders or combinations of a single acting and a double acting cylinder.

The controller 219, in one embodiment includes a user control device configured to adjust the direction of the flow of fluid through the motor 224 such that the direction of rotation of the hub 110 of FIG. 5 is moved about a central axis thereof in a first direction 240 and a second direction 242. The controller 219, in different embodiments includes one or more of, mechanical adjustment devices, electronic adjustment devices, graphical user interface screens, electronic displays, and other known controllers. Each of the adjustment devices is configured to control the direction of the rotation of the hub 110. In one or more embodiments, the speed of rotation of the hub 110 is also controllable. In addition to the adjustment devices, in these and other embodiments, the controller 219 includes an electronic controller configured to control the flow of fluid in response to an input provided by the operator of the baler, either through devices located at the baler or located at a tractor or other vehicle pulling the baler. The electronic controller, in different embodiments, includes a microcontroller, a microprocessor, dedicated circuitry, or software controlled circuitry configured to provide the directional control of the hub 110 in response to a user input.

In operation and in response to a user input, a fluid from the hydraulic source 212 moves along the fluid line 216, from the valve 214 and toward the valve 220. This fluid flow actuates the cylinder 184, which through the action of the rod 230, moves the idler pulley 196 into contact with the belt 166. The application of the idler pulley 196 applies a tension so the belt 166 at the first location 176 as previously described. The fluid continues along the flow path through the motor 150 thereby rotating the pulley 154 in the direction 240. The fluid continues along a flow path from the motor 150 through the valve 222, the fluid line 218, to the valve 214 and to the hydraulic source.

To move the hub 110 in the second direction 242, the flow of fluid through the fluid circuit is reversed, such that fluid flow moves from the hydraulic source 212, through the valve 214, along the fluid line 218, and through the valve 222. The fluid flow actuates the cylinder 186 to move the rod 232 and the idler pulley 198 into contact with the belt 166. The application of the idler pulley 198 applies a tension to the belt 166 at the second location 178 as previously described. The fluid flow continues through the port 226, the motor 150, through the port 224, through the valve 220 along the fluid line 216, through the valve 214 and back to the source 212.

Both the hydraulic motor 150 and the hydraulic cylinders 184 and 186 respond to the direction of flow in the fluid circuit 210. The belt tension is appropriately controlled depending on the directions of rotation 240 and 242. The belt tension is proportionally regulated in response to the transmitted torque provided by the motor 150. The belt tension either increases or decreases appropriately with the direction and torque output of the motor 150. The belt tension is applied proportionally to the torque output of the motor 150 to reduce or substantially prevent belt slippage. The idler system 140, therefore, applies back side tension to the belt with bi-directional capabilities.

The application of the idler system to the belt, or the tensioning force applied, is proportional to the motor torque, such that the tensioning force increases under increased torque of the motor to reduce or substantially prevent belt slippage. When the motor is not producing any drive force, the idler system does not apply a tensioning force thereby disengaging the idler pulley 196 and the idler pulley 198 from the belt 166. The tensioning force is automatically applied to the belt in proportion to the drive force provided by the motor and does not require an operator to select the amount of force to be applied to the belt, since the tensioning system automatically increases/decreases the tensioning force. When the motor is not producing any drive force, the tensioner disengages or does not apply a sufficient force to tension the belt.

The controller 219, in different embodiments, is configured to control the operation of the valves 220 and 222 to control the pressure and/or flow control delivered to the respective hydraulic cylinders 184 and 186. In one embodiment, the valves 220 and 222 are operatively connected to respective control lines 246 and 248 which transmit signals to respective valves to adjust the fluid flow or pressure in the fluid lines 216 and 218. The valves 220 and 222, in different embodiments, are configured to control the amount of tension provided by the pulleys 196 and 198 through the action of the cylinders 184 and 186. In other embodiments, the valves 220 and 222 are not included. In another embodiment, one or both of the valves 220 and 222 are operatively controlled by the controller 219 to sequence the flow, by flow rate or pressure, to engage the belt 166 before the motor 150 begins to move in one of the first and the second directions. In this embodiment, the movement of the first pulley wheel 154 through actuation of the motor 150 drives the belt 166 substantially immediately such that there is minimal lag between actuation of the motor 150 and movement of the second pulley wheel 158. In another embodiment, the controller 219 is replaced with a hydraulic controller including hydraulic control valves which are configured to provide the sequencing and the flow of fluid provided to the motor 150 and to the hydraulic cylinders 184 and 186 as described herein.

Figure 7:
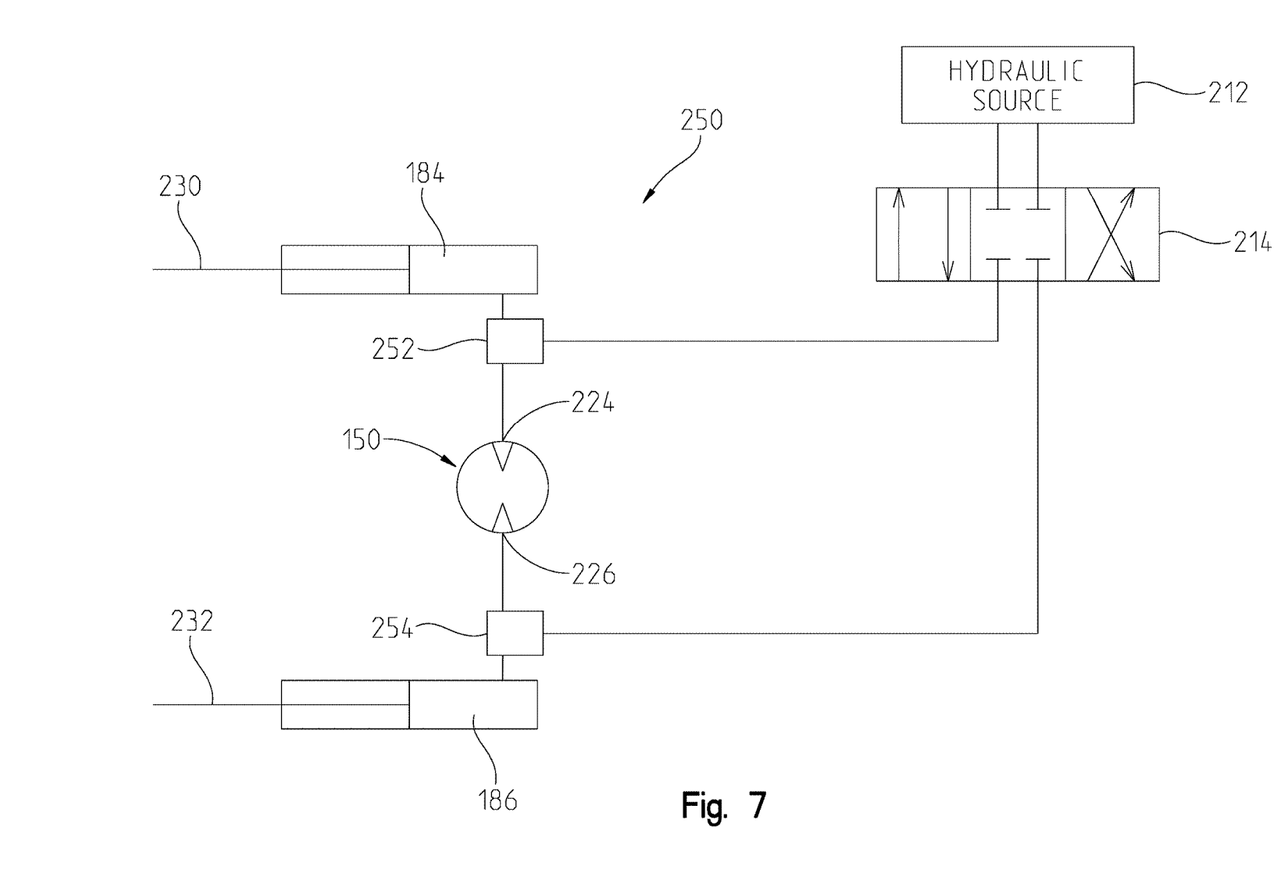
FIG. 7 illustrates another embodiment of a fluid control circuit.

FIG. 7 illustrates another embodiment of a fluid control circuit 250 operatively connected to the motor 150 and to the hydraulic cylinders 184 and 186. As in FIG. 6, each of the hydraulic cylinders includes respective piston rods 230 and 232. In addition, the hydraulic source 212 is operatively connected to the valve 214 which is configured to provide a flow of fluid to and from the motor 150 over the first fluid line 216, or conduit, and the second fluid line 218, or conduit. In this embodiment, a first pressure control valve 252 is operatively connected to the port 224 of the motor 150 and a second pressure control valve 254 is operatively connected to the port 226 of the motor 150. Each of the first and second pressure control valves 252 and 254 are operatively connected respectively to the hydraulic cylinders 184 and 186 as described herein. In this embodiment, however, a controller, such as the controller 219 of FIG. 6 is not required. Each of the first and second pressure control valves 252 and 254 include, in different embodiments, a pressure relief valve or an internally piloted sequence valve. The valves are selected for the application in the fluid control circuit to provide pressure relief at the appropriate pressure. Consequently, the fluid control circuit is configured to adjust the tension based, in part, on the type of valve selected.

Figure 8:
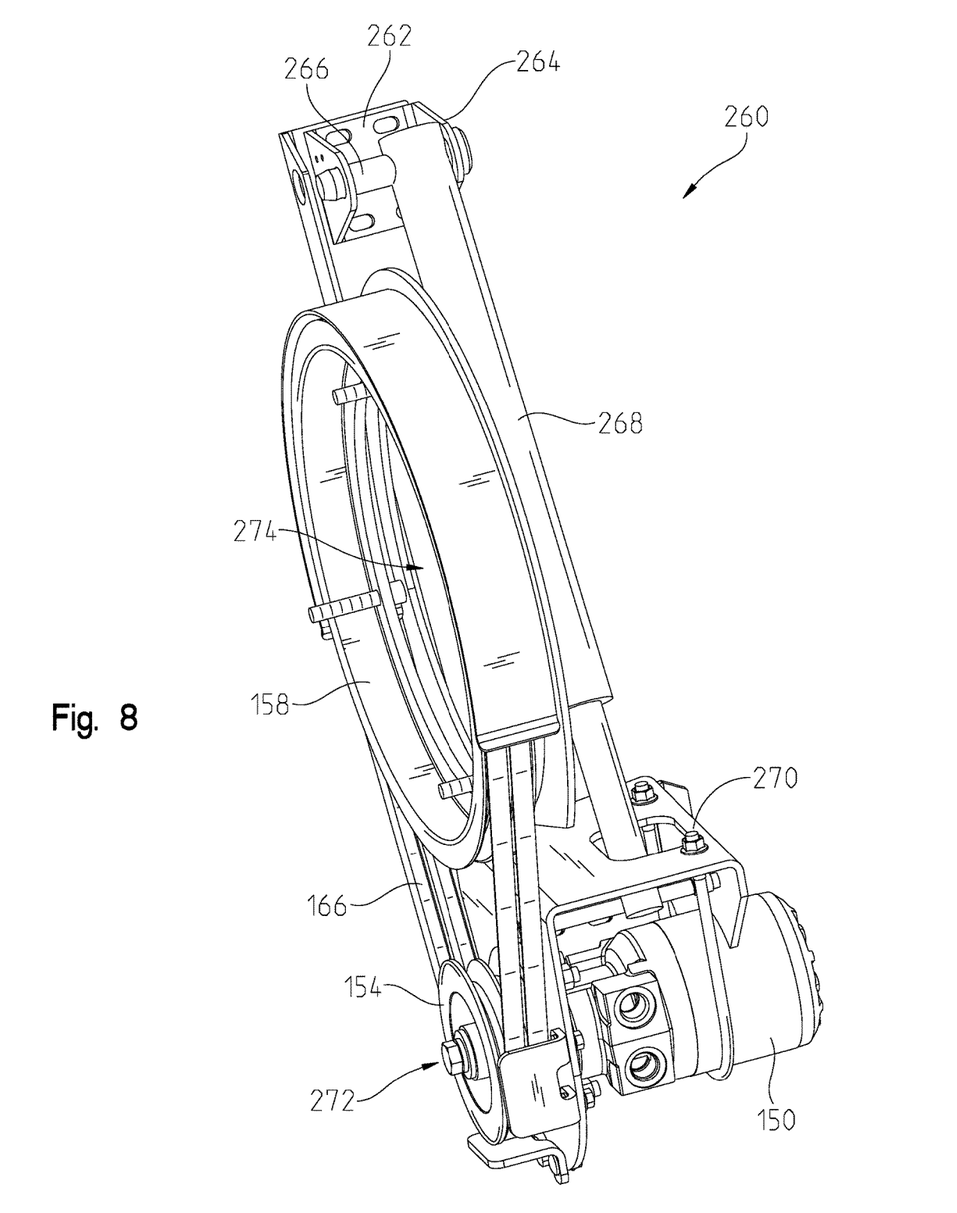
FIG. 8 illustrates a perspective view of another embodiment of an idler system.

FIG. 8 illustrates a perspective view of another embodiment of an idler system 260. As described herein, the motor 150 and associated pulley 154 are configured to drive the pulley 158 with the belt 166. In this embodiment, however, the idler system 260 includes a frame 262 configured to support the motor 150 with respect to the pulley 158. The frame 262, at a first end 264, includes a pin 266 configured to support one end of a hydraulic actuator 268. Another end of the hydraulic actuator 268 is operatively connected to a motor support 270 which is configured to adjustably support the motor 150 with respect to the frame 262. Actuation of the hydraulic actuator 268 adjusts the motor support 270 with respect to the pin 262. Consequently, a distance between a center 272 of the pulley 154 is adjustable with respect to a center 274 of the pulley 158. By actuating the hydraulic actuator 268, the distance between the center 272 and the center 274 is either increased or decreased to increase or to reduce the tension of the belt 166.

Figure 9:
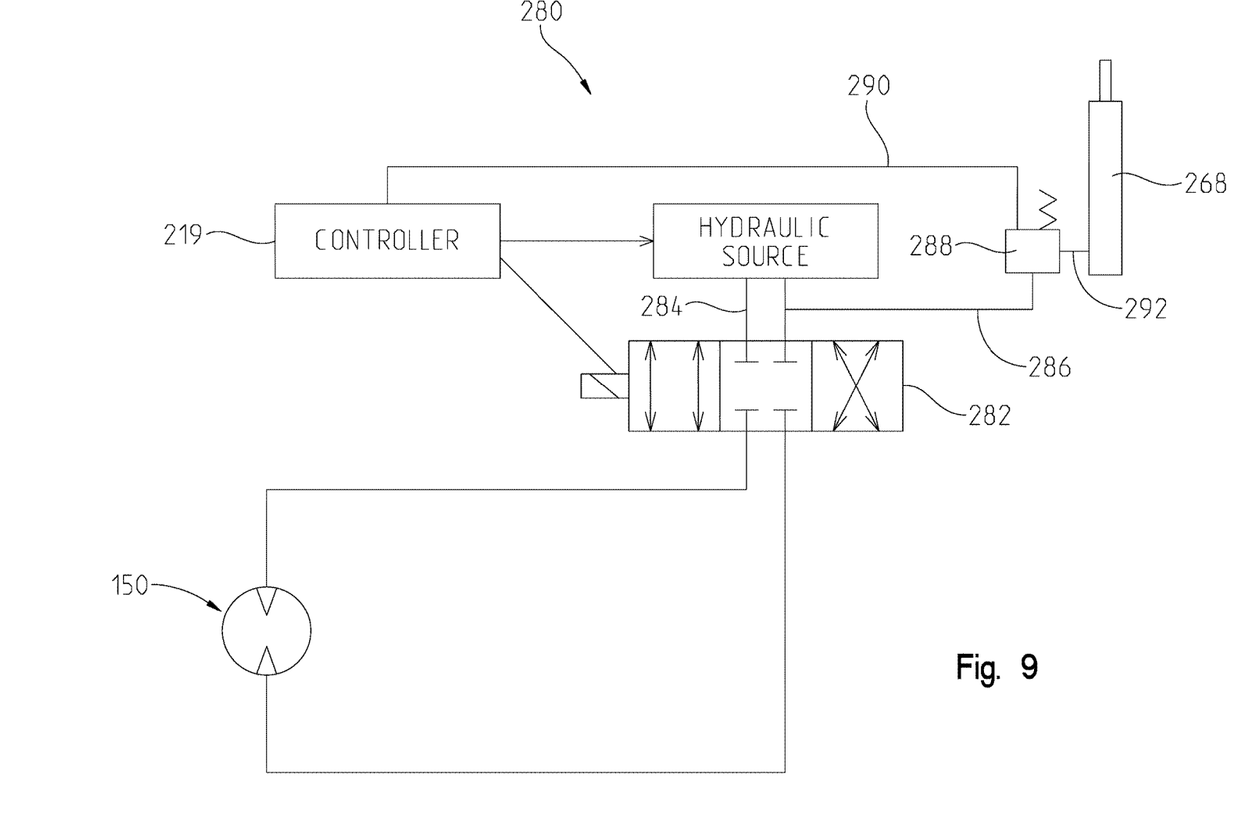
FIG. 9 illustrates another embodiment of a fluid control circuit.

FIG. 9 illustrates another embodiment of a fluid control circuit 280 operatively connected to the motor 150 of the idler system 260 of FIG. 8. As in FIG. 6, the hydraulic source 212 is operatively connected to the motor 150 and the operation thereof is controlled by the controller 219. A valve 282 is operatively connected to the controller 219 for movement of the valve from at least a first position to a second position to control the motor 150. In one embodiment, the valve 282 is a selectable control valve configured to respond to one or more control signals provided by the controller 219. The selectable control valve 282, in different embodiments, is located on a vehicle, such as a tractor, or on a work machine such as a bailer. A low pressure return line 284 couples the valve 282 to the source 212 and a high pressure line 286 couples the valve 282 to the source 212. Additionally, the high pressure line 286 is operatively connected to a pressure control valve 288. In different embodiments, the pressure control valve 288 includes a pressure relief valve or an internally piloted sequence valve. A control line 290 operatively connects the controller 219 to the valve 288 to provide control signals to the valve 288. An output 292 of the valve 288 is coupled to the cylinder 268. Upon receiving an actuation signal from the controller 219, the valve 288 moves the motor 150 from a first position to a second position to thereby adjust the tension of the belt 166 of FIG. 8.

While exemplary embodiments incorporating the principles of the present disclosure have been disclosed herein, the present disclosure is not limited to the disclosed embodiments. Instead, this application is intended to cover any variations, uses, or adaptations of the disclosure using its general principles. Therefore, this application is intended to cover such departures from the present disclosure as come within known or customary practice in the art to which this disclosure pertains.

The invention claimed is:

1. A method of providing a crop preparation or handling operation with a performance system of an agricultural work machine driven by a primary power source, the method comprising:
providing a primary drive system operatively connected to the primary power source and configured to drive the performance system for the crop preparation or handling operation;
providing a secondary drive system operatively connected to the primary drive system, wherein the secondary drive system includes a fluid driven motor adapted to receive a flow of pressurized fluid and having a drive shaft providing a torque, the fluid driven motor operatively connected to a belt configured to adjust a condition of the primary drive system; and
automatically adjusting a tension of the belt proportionally in response to the torque provided by the drive shaft of the fluid driven motor by applying a force at a first location of the belt based on a fluid flow through the fluid driven motor in a first direction and automatically adjusting the tension of the belt by applying a force at a second location of the belt based on a fluid flow through the fluid driven motor in a second direction.

2. The method of claim 1 wherein the step of providing a secondary drive system includes the fluid driven motor being a hydraulic motor having a first port and a second port adapted to receive the flow of pressurized fluid.

3. The method of claim 2 further comprising increasing the tension of the belt proportionally to an increase in the torque provided by the drive shaft of the hydraulic motor, and decreasing the tension of the belt proportionally to a decrease in the torque provided by the drive shaft of the hydraulic motor.

4. The method of claim 3 further comprising reducing the tension of the belt in response to the hydraulic motor not providing any torque.

5. The method of claim 2 further comprising directing the flow of fluid in the first direction from the first port to the second port to rotate the drive shaft in a first direction of rotation and directing the flow of fluid from the second port to the first port to drive the drive shaft in the second direction of rotation.

6. A method of preparing or handling crops with a performance system of an agricultural work machine driven by a primary power source, wherein the work machine includes a primary drive system operatively connected to the primary power source and a secondary drive system having a drive shaft operatively connected to the primary drive system, the method comprising:
adjusting a direction of the drive shaft in one of a first direction and a second direction with a directional flow of fluid, wherein the directional flow of fluid determines an amount of torque provided by the drive shaft in the first direction or the second direction; and
applying at least one force to the drive system to adjust a tension thereof, wherein the force is applied proportionally in response to the amount of torque provided by the drive shaft.

7. The method of claim 6 wherein the step of adjusting includes adjusting the direction of the drive shaft with a hydraulic motor having a first port and a second port adapted to receive the directional flow of fluid, wherein a first directional flow of fluid from the first port to the second port determines the amount of torque applied by the drive shaft in the first direction and a second directional flow of fluid from the second port to the first port determines the amount of torque delivered by the drive shaft in the second direction.

8. The method of claim 7 wherein the secondary drive system includes a belt operatively connected to drive shaft and wherein the step of applying at least one force includes applying a first force to the belt, wherein the first force is applied proportionally based on the amount of torque delivered by the drive shaft in the first direction.

9. The method of claim 8 wherein the step of applying includes applying a second force to the belt, wherein the second force is applied proportionally based on the amount of torque delivered by the drive shaft in the second direction.

10. The method of claim 9 wherein step of applying a first force includes applying the first force to a first location on the belt to adjust the tension thereof.

11. The method of claim 10 wherein the step of applying a second force includes applying the second force to a second location on the belt to adjust the tension thereof.

12. The method of claim 11 further comprising applying a first bias with a first bias element to the belt in a direction opposite to a direction of the applied first force.

13. The method of claim 12 further comprising applying a second bias with a second bias element to the belt in a direction opposite to a direction of the applied second force.

14. A method of preparing or handling crops with a performance system of an agricultural work machine driven by a primary power source, wherein the work machine includes a primary drive system operatively connected to the primary power source and a secondary drive system having a drive shaft operatively connected to the primary drive system, the method comprising:
providing a user input device configured to generate a user input; adjusting a rotational speed and torque of the drive shaft in response to the user input with a directional flow of fluid in one of a first direction and a second direction, wherein the directional flow of fluid determines the rotational direction of the drive shaft in the first direction or the second direction; and
applying at least one force to the drive system to adjust a tension thereof, wherein the force is applied proportionally in response to a torque of the drive shaft.

15. The method of claim 14 wherein the step of adjusting includes adjusting the rotational speed and torque of the drive shaft with a hydraulic motor having a first port and a second port adapted to receive the directional flow of fluid, wherein a first directional flow of fluid from the first port to the second port determines the rotational speed of the drive shaft in the first direction and a second directional flow of fluid from the second port to the first port determines the rotational speed of the drive shaft in the second direction.

16. The method of claim 15 wherein the secondary drive system includes a belt operatively connected to drive shaft and wherein the step of applying at least one force includes applying a first force to the belt, wherein the first force is applied proportionally based on the torque delivered by the drive shall in the first direction.

17. The method of claim 16 wherein the step of applying includes applying a second force to the belt, wherein the second force is applied proportionally based on the torque delivered by the drive shaft in the second direction.

* * * * *